United States Patent
Jang et al.

(10) Patent No.: US 9,369,013 B2
(45) Date of Patent: Jun. 14, 2016

(54) ROTOR FOR MOTOR

(75) Inventors: Jeong Cheol Jang, Gwangju (KR); Ji Min Lee, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 208 days.

(21) Appl. No.: 14/235,089

(22) PCT Filed: Jun. 19, 2012

(86) PCT No.: PCT/KR2012/004829
§ 371 (c)(1),
(2), (4) Date: Jan. 27, 2014

(87) PCT Pub. No.: WO2013/047979
PCT Pub. Date: Apr. 4, 2013

(65) Prior Publication Data
US 2014/0191608 A1 Jul. 10, 2014

(30) Foreign Application Priority Data

Sep. 27, 2011 (KR) .................. 10-2011-0097633

(51) Int. Cl.
*H02K 1/27* (2006.01)

(52) U.S. Cl.
CPC .................. *H02K 1/27* (2013.01); *H02K 1/276* (2013.01); *H02K 1/2773* (2013.01)

(58) Field of Classification Search
CPC ...... H02K 1/2773; H02K 1/276; H02K 15/03
USPC ....................... 310/156.22, 156.47
See application file for complete search history.

(56) References Cited

U.S. PATENT DOCUMENTS

| 5,091,668 | A  | * | 2/1992 | Cuenot | H02K 1/2773 310/156.61 |
| 6,700,288 | B2 | * | 3/2004 | Smith | H02K 21/14 310/156.38 |
| 2009/0195101 | A1 | * | 8/2009 | Yang | H02K 1/278 310/156.22 |
| 2010/0026124 | A1 | * | 2/2010 | Lu | H02K 1/278 310/156.12 |
| 2011/0254399 | A1 | * | 10/2011 | Blanc | H02K 1/2773 310/156.22 |

FOREIGN PATENT DOCUMENTS

| JP | 1994-311679 A | 11/1994 |
| JP | 2006-020406 A | 1/2006 |
| JP | 2008-043157 A | 2/2008 |
| KR | 20-0336191 Y1 | 12/2003 |

* cited by examiner

*Primary Examiner* — Dang Le
*Assistant Examiner* — Leda Pham

(57) ABSTRACT

Disclosed therein is a rotor for a motor. The rotor includes: a rotor core including an annular ring having a shaft hole formed at a central portion thereof, a plurality of yokes formed around the annular ring, and magnet insertion holes formed between the neighboring yokes; magnets respectively inserted into the magnet insertion holes; and a pair of rotor covers each having a ring plate, which has a shaft insertion hole formed at a central portion thereof, and a plurality of stoppers protrudingly formed around the ring plate. A pair of the rotor covers are joined to an upper portion and a lower portion of the rotor core in such a fashion that the stoppers are respectively located at side portions of the magnet insertion holes.

4 Claims, 4 Drawing Sheets

Prior Art

ROTOR FOR MOTOR

CROSS REFERENCE TO PRIOR APPLICATIONS

This application is a National Stage Application of PCT International Patent Application No. PCT/KR2012/004829 filed on Jun. 19, 2012, under 35 U.S.C. §371, which claims priority to Korean Patent Application No. 10-2011-0097633 filed on Sep. 27, 2011, which are all hereby incorporated by reference in their entirety.

TECHNICAL FIELD

The present invention relates to a rotor for a motor. More particularly, the present invention relates to a rotor of a new structure for a motor, which is simple in manufacturing process and can reduce manufacturing costs.

BACKGROUND ART

In general, a motor includes a stator and a rotor, and the rotor has various kinds and forms. The present invention relates to a rotor having a permanent magnet embedded inside a rotor core.

A rotor 100 having the above form according to a prior art is illustrated in FIG. 1.

As shown in FIG. 1, the rotor 100 according to the prior art includes a rotor core 110 in which a plurality of magnets (not shown) are inserted, and a molding part 120 made of plastic resin, such as PBT resin and formed around the core 110. A shaft 50 joined to a central portion of the rotor core 110 is rotated by the rotation of the rotor core 110 to rotate a load connected to the shaft.

In the conventional rotor 100, the molding part 120 surrounding the rotor is formed through the steps of inserting the rotor core 110 into a mold and performing insert injection molding. As described above, the process of manufacturing the molding part 120 through the insert injection molding has the following problems.

First, because the mold of the rotor shape must be manufactured for the insert injection molding, it cause expensive manufacturing costs and the manufacturing process is complicated.

Second, because the inside of the rotor and considerable portions of the outer face of the rotor are made of plastic resin, the rotor requires a great deal of resin and a great amount of resin is lost during the molding work, and hence, manufacturing costs are increased.

Third, the rotor core 110 is generally manufactured using laminated thin steel sheets, but in the case that thin steel sheets are not laminated exactly vertically but laminated somewhat slantly without even straightness, because the rotor core is not inserted well into the mold, the insert injection molding is impossible and there is a high defection rate.

Accordingly, the inventor of the present invention recognize the above problems of the rotor manufacturing process using the insert injection molding method, and hence, propose a new structure of a rotor, which can solve the above problems by applying not the insert molding method but a method of applying a rotor cover to the outside of the rotor.

DISCLOSURE OF INVENTION

Technical Problem

Accordingly, the present invention has been made in an effort to solve the above-mentioned problems occurring in the prior arts, and it is an object of the present invention to provide a rotor of a motor, which is simple in manufacturing process.

It is another object of the present invention to provide a rotor of a motor, which can reduce manufacturing costs.

It is a further object of the present invention to provide a rotor of a motor, which has a structure that can complete the rotor even though straightness of the rotor core is somewhat deviated.

The foregoing and other objects and features of the present invention may be all achieved through the detailed description of the invention that follows.

Solution to Problem

To achieve the above objects, the present invention provides a rotor for a motor including: a rotor core including an annular ring having a shaft hole formed at a central portion thereof, a plurality of yokes formed around the annular ring, and magnet insertion holes formed between the neighboring yokes; magnets respectively inserted into the magnet insertion holes; and a pair of rotor covers each having a ring plate, which has a shaft insertion hole formed at a central portion thereof, and a plurality of stoppers protrudingly formed around the ring plate, wherein a pair of the rotor covers are joined to an upper portion and a lower portion of the rotor core in such a fashion that the stoppers are respectively located at side portions of the magnet insertion holes.

In the present invention, each of the yokes includes a through hole formed in a longitudinal direction and at least one rivet insertion hole formed at a position corresponding to the through hole of the rotor cover. In this instance, the rotor may further include a rivet penetrating the rivet insertion hole.

In the present invention, the rotor core includes a plurality of joining holes formed in the annular ring in a longitudinal direction and the rotor cover comprises a plurality of first joining protrusions formed around the shaft insertion hole of the ring plate of the rotor cover and at positions corresponding to the joining holes.

In the present invention, each of the yokes includes a through hole formed in a longitudinal direction and the ring plate includes at least one second joining protrusion formed at a position corresponding to the through hole of the rotor cover, and the second joining protrusion is joined to the through hole located at the corresponding position.

Advantageous Effects of Invention

The rotor for the motor according to the present invention is simple in manufacturing process, is low in manufacturing costs, and has a new structure enabling a user to do work even though straightness of the motor core is not kept thoroughly.

Description will now be made in detail of preferred embodiment of the present invention with reference to the attached drawings.

MODE FOR THE INVENTION

Figure 2:
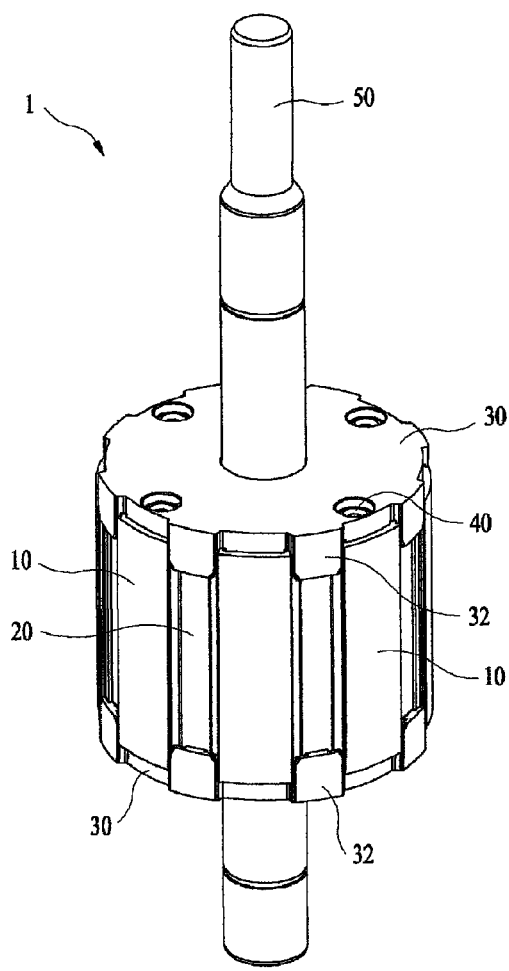
FIG. 2 is a perspective view of a rotor for a motor according to the present invention.
Figure 3:
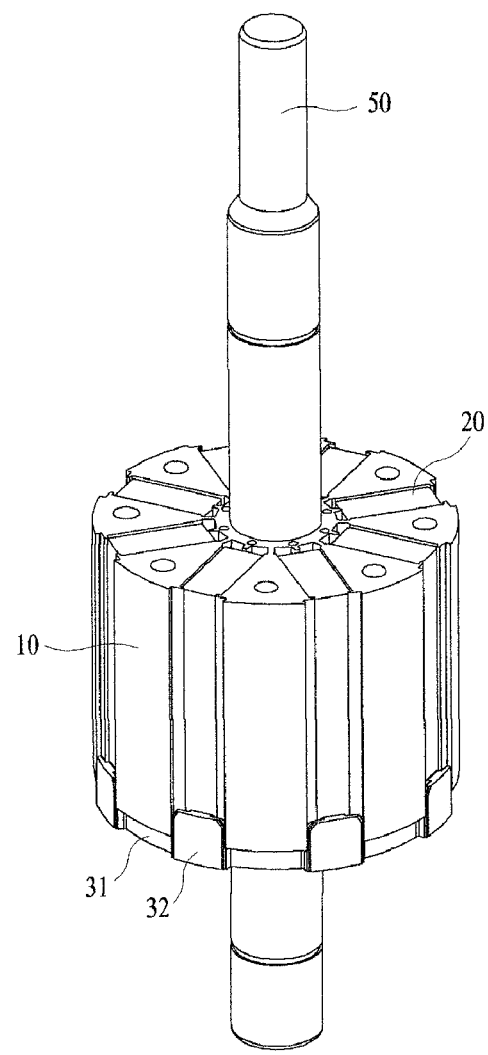
FIG. 3 is a perspective view showing a state where one rotor cover is removed from the rotor for the motor according to the present invention.

FIG. 2 is a perspective view of a rotor 1 for a motor according to the present invention, and FIG. 3 is a perspective view showing a state where one rotor cover is removed from the rotor 1 for the motor according to the present invention.

As shown in FIGS. 2 and 3, the rotor 1 according to the present invention includes a rotor core 10, magnets 20, rotor covers 30, a rivet 40, and a shaft 50.

The rotor core 10 is manufactured in such a fashion that a plurality of steel sheets are laminated and has a structure that a plurality of magnets 20 are insertable into the rotor core 10. Moreover, the rotor core 10 has a hole through which a shaft 50 penetrates into a central portion of the rotor core 10. The shaft 50 is fixed at the central portion of the rotor core 10 so as to rotate with the rotor core 10.

Figure 1:
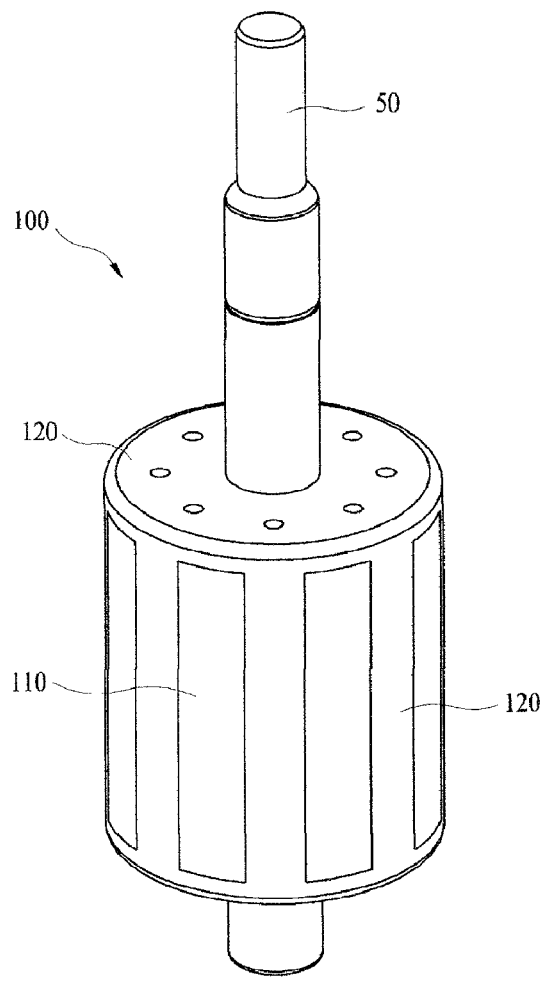
FIG. 1 is a perspective view of a rotor for a motor according to a prior art.

The rotor 100 according to the prior art illustrated in FIG. 1 has a structure that the magnets embedded inside the rotor core 110 are not exposed to the outside, but the magnets 20 of the rotor 1 according to the present invention has a structure that the sides of the magnets 20 are exposed to the outside so that a user can see them from the outside of the rotor core 10 as shown in FIGS. 2 and 3.

Furthermore, in the case of the rotor 100 according to the prior art, an upper portion, a lower portion and sides of the rotor core 110 are formed by a resin mold 120 by an insert injection molding, but the rotor 1 according to the present invention is not made through the insert injection process but a pair of rotor covers 30 are joined to an upper portion and a lower portion of the rotor core 10. In this instance, stoppers 32, which project in a longitudinal direction of the shaft 50 are formed at positions corresponding to the magnets 20 of the rotor cover 30. The stoppers 32 serve to more firmly join the rotor covers 30 to correct positions when the rotor covers 30 are joined to the rotor core 10, and serve to prevent the magnets 20 from being separated to the outside by the centrifugal force when the rotor 1 is rotated.

Figure 4:
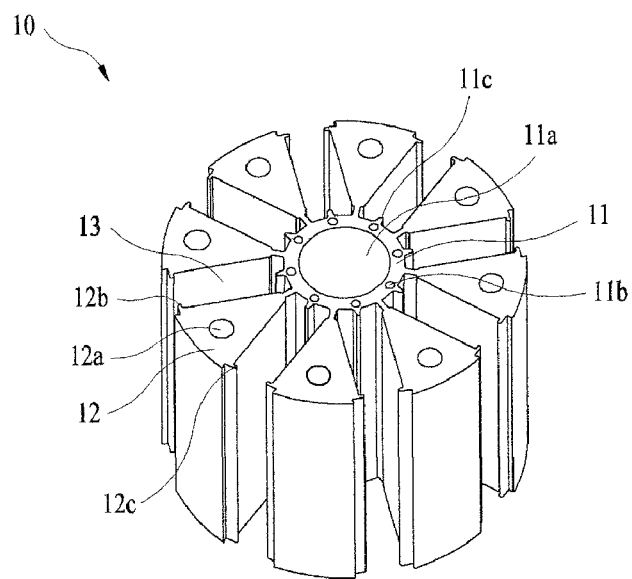
FIG. 4 is a perspective view of a rotor core of the rotor for the motor according to the present invention.

A pair of the rotor covers 30 are respectively joined to the upper portion and the lower portion of the rotor core 10. The rotor covers 30 are joined to each other by a rivet 40 to thereby provide firmer joining force. The rivet 40 penetrates the rotor core 10. Referring to FIG. 4, the structure of the rotor 1 will be described in more detail.

FIG. 4 is a perspective of the rotor core 10 for the motor according to the present invention.

As shown in FIG. 4, the rotor core 10 according to the present invention includes a annular ring 11 having a shaft hole 11a at a central portion thereof, a plurality of yokes 12 formed around the annular ring 11, and magnet insertion portions 13, which are formed between the yokes 12 and are spaces for inserting the magnets.

The shaft hole 11a formed at the central portion of the annular ring 11 is a portion that the shaft 50 passes through and is fixed. The plural yokes 12, which are approximately fan-shaped and are in a flat form, are formed around the annular ring 11. The plural yokes 12 are respectively formed at portions where the circumference is equally divided. That is, in the case that the central point of the annular ring 11 is connected from the central point of the circular arc of each yoke, an angle between neighboring connection lines is 45 degrees obtained by dividing 360 degrees by eight in the case that there are eight yokes as shown in FIG. 4. Of course, in the drawing, the rotor core has eight yokes, but it will be understood to those skilled in the art that the present invention is not limited to the eight yokes.

A plurality of joining holes 11b are formed between the outer diameter and the inner diameter of the annular ring 11. Joining projections formed on the rotor covers 30 are inserted and fixed into the joining holes 11b. In the meantime, the magnet insertion portions 13 formed between the neighboring yokes 12 are spaces for inserting the magnets thereinto. First protrusions 11c are formed on the outer circumferential surface of the annular ring 11 inside the magnet insertion portions 13, protrude in the outer diameter direction and formed in the longitudinal direction of the shaft 50. The first protrusions 11c serve to hold the positions of the magnets 20.

The yoke 12 has a through hole 12a formed therein and penetrates into the longitudinal direction of the shaft 50. The through hole 12a is a hole to insert the rivet 40 or the joining projections of the rotor covers 30 thereinto.

Meanwhile, the yoke 2 has a first projection 12b and a second projection 12c, which are protrudingly formed at outer diameter portions in an arc-shaped direction. The first projection 12b and the second projection 12c serve to fix the positions of the magnets together with the first protrusions 11c when the magnets are inserted into the magnet insertion portions 13.

Figure 5:
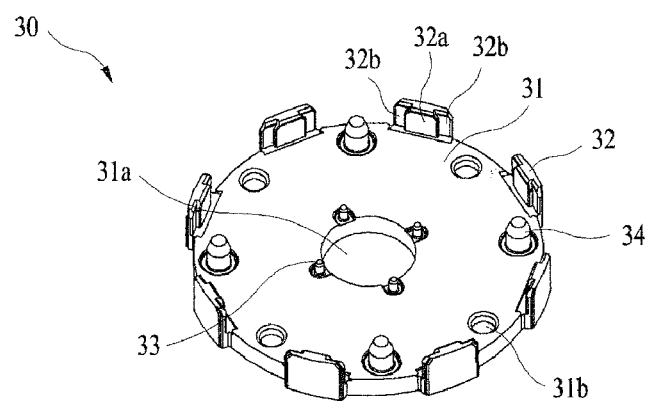
FIG. 5 is a perspective view showing a rotor cover of the rotor for the motor according to the present invention.

FIG. 5 is a perspective view of the rotor cover 30 for the rotor according to the present invention.

As shown in FIG. 5, the rotor cover 30 according to the present invention includes a ring plate 31 having a shaft insertion hole 31a formed at a central portion thereof, and a stopper 32 formed on the outer circumferential surface of the ring plate 31 and projecting in the longitudinal direction of the shaft 50.

As described above, the stopper 32 is to prevent the magnets 20 from being separated in the direction of the centrifugal force when the rotor 1 is rotated, and includes: a protruding portion 32a protruding to a predetermined extent in a direction of the inside of the stopper 32, namely, toward the shaft; and retaining portions 32b formed at both sides of the protruding portion 32a, so that the protruding portion 32a is located between the first projection 12b and the second projection 12c of the neighboring yokes 12 of the rotor core 10. The retaining portions 32b are seated on the outer faces of the first projection 12b and the second projection 12c, so that the rotor covers 30 can be firmly joined at correct positions when the rotor covers 30 are joined to the rotor core 10.

A plurality of first joining protrusions 33 are formed around the shaft insertion hole 31a of the ring plate 31. The first joining protrusions 33 are joined to the joining holes 11b formed in the annular ring 11 at the central portion of the rotor core 10. In FIGS. 4 and 5, eight joining holes 11b and four first joining protrusions 33 are illustrated, but the number of the joining holes and the number of the joining protrusions are not restricted to the above, and it will be understood to those skilled in the art that a change in the number of the joining holes and the joining protrusions does not get out of the scope of the present invention.

The ring plate 31 of the rotor cover 30 has rivet insertion holes 31b and second joining protrusions 34 formed at positions corresponding to the through holes 12a formed in each yoke 12 of the rotor core 10. The rivet insertion holes 31b are holes to insert rivets thereinto and the second joining protrusions are inserted and fixed into the through holes 12a. In FIG. 5, there are four rivet insertion holes 31b and four second joining protrusions 34, but the number of the rivet insertion holes and the number of the second joining protrusions are not restricted to the above.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

The invention claimed is:

1. A rotor for a motor comprising:
a rotor core including an annular ring having a shaft hole formed at a central portion thereof, a plurality of yokes formed around the annular ring, magnet insertion holes formed between the neighboring yokes, and a plurality of joining holes formed between the outer diameter and the inner diameter of the annular ring,
wherein each yoke has a first projection and a second projection, which are protrudingly formed at outer diameter of the yoke in an arc-shaped direction;
magnets respectively inserted into the magnet insertion holes; and
a pair of rotor covers each having a ring plate, which has a shaft insertion hole formed at a central portion thereof, a plurality of stoppers protrudingly formed around the ring plate, and a plurality of first joining protrusions formed around the shaft insertion hole of the ring plate, wherein,
each stopper is formed of a protruding part and retaining parts, the protruding part protruding to a predetermined extent toward the shaft and the retaining parts being disposed at both sides of the protruding part,
when the pair of the rotor covers are joined to an upper portion and a lower portion of the rotor core,
the protruding part is disposed between the first projection and the second projection of the yoke and the retaining parts are seated on outer faces of the first projection and the second projection,
the stoppers are respectively located at side portions of the magnet insertion holes, and
the first joining protrusions formed on the rotor covers are inserted and fixed into the joining holes.

2. The rotor according to claim 1, wherein each of the yokes comprises a through hole formed in a longitudinal direction and at least one rivet insertion hole formed at a position corresponding to the through hole of the yoke.

3. The rotor according to claim 2, further comprising a rivet penetrating the rivet insertion hole.

4. The rotor according to claim 1, wherein,
each of the yokes comprises a through hole formed in a longitudinal direction and
the ring plate comprises at least one second joining protrusion formed at a position corresponding to the through hole of the yoke, the second joining protrusion being joined to the through hole located at the corresponding position.

* * * * *